Jan. 2, 1973 R. BAINBRIDGE 3,708,409

CHEMICAL PROCESS IN HIGH ENTHALPY THERMAL ENVIRONMENT AND APPARATUS THEREFOR

Filed May 22, 1969 5 Sheets-Sheet 1

Jan. 2, 1973 R. BAINBRIDGE 3,708,409

CHEMICAL PROCESS IN HIGH ENTHALPY THERMAL ENVIRONMENT AND APPARATUS THEREFOR

Filed May 22, 1969 5 Sheets-Sheet 2

3,708,409
Patented Jan. 2, 1973

3,708,409

CHEMICAL PROCESS IN HIGH ENTHALPY THERMAL ENVIRONMENT AND APPARATUS THEREFOR

Robert Bainbridge, West Vancouver, British Columbia, Canada, assignor to Ionarc Smelters Ltd., British Columbia, Canada Continuation-in-part of applications Ser. No. 708,853 and Ser. No. 708,921, both Feb. 28, 1968. This application May 22, 1969, Ser. No. 826,991
Int. Cl. B01k *1/00;* C22b
U.S. Cl. 204—164 30 Claims

ABSTRACT OF THE DISCLOSURE

A process of the continuous type for treating a flowable non-gaseous material includes the steps of establishing an electric arc condition and maintaining that arc condition at a current density sufficient to give the arc a positive resistance characteristic to establish a high enthalpy zone, introducing the flowable material for passage through the maintained arc and the high enthalpy zone and then through a cooling atmosphere to a collection zone. The apparatus for performing this process includes a chamber in which are disposed a pair of spaced carbon containing electrodes between which a high intensity arc discharge is established with a tail flame so that an elongated high enthalpy zone is defined.

This application is a continuation-in-part of my copending patent applications Ser. No. 708,853, filed Feb. 28, 1968 and Ser. No. 708,921, filed Feb. 28, 1968.

This invention relates to processes and apparatus for heat effecting material. More particularly it relates to a high temperature process for effecting chemical reactions in metal ores and compounds and is specifically concerned with the winning of metals from ores in one or a plurality of stages.

The scope of this invention is necessarily very wide as the novel technique described herein is applicable to the production of many metals and also to many other chemical reactions and material treatment processes.

There are many known methods for the production of metals from their ores, and a large number of them are pyrometallurgical in nature. Some metals are relatively easily won from their ores, for example copper and iron while others are won with extreme difficulty, for example titanium and zirconium. The ease of extraction is naturally reflected in the availablity and price of the metal. As technology advances the demands for metals such as columbium, tantalum, zirconium and titanium grows, and many efforts are therefore being made to extract these metals more economically.

It is an object of the present invention to provide a process for effecting chemical reactions.

A more specific object is to provide a process for effecting a chemical reaction involving a metal compound.

Another more specific object is to provide a process for winning a metal from its ore, particularly metals which are difficult to extract from their ores.

Another object of the invention is to provide a more effective process for winning a metal from its ore.

A specific object of the present invention is to provide a process for the selective chlorination of platinum and other precious metals in an ore.

It has been found that the objects of the invention can be achieved by establishing a high enthalpy thermal environment, injecting reactants, at least one of which is a solid in particulate form or a liquid, into said environment, providing adequate reactant residence time for heating and dissociating at least part of said reactants in said environment, whereby a desired chemical reaction takes place. Preferably the process includes the separation of the various products of the reaction.

By another aspect of the invention there is provided a process which comprises establishing a controlled electric arc or plurality of arcs; injecting finely divided chemical compounds dispersed in a gas into the resultant high energy thermal environment; heating and dissociating at least part of said compounds in said environment whereby a desired chemical reaction takes place. The reaction products are collected in a suitable trapping system to insure that the desired products remain in a form suitable for further processing.

By high enthalpy thermal environment is meant an environment wherein a high atom as well as a high electron temperature is maintained, for example in a high intensity plasma arc, in contrast to a glow discharge or a silent arc discharge, or a "cold atom" reactor. A high intensity plasma arc is defined as an electric arc condition that is struck between at least two electrodes, which arc that is an increase in current is accompanied by an increase in voltage across the arc. In a particular embodiment this high intensity plasma arc is obtained by an arc struck between two graphite electrodes which are overpowered so that the electrodes are at least partially vaporized and consumed. A tail flame is characteristic of a high intensity arc and such an arc in a diatomic gas will generate temperatures of the order 4000–8500° C. with relatively low gas velocities compared with gas velocities in arcs of the "non-transferred" type. The high intensity arc condition can also be obtained in other arrangements, for example an arrangement in which an anode is porous and a gas is supplied to the arc region through the pores of the anode.

In a particular process, an electric arc is established between carbon containing electrode material and the electrode material is overpowered to establish an arc condition that has a positive electrical resistance characteristic and produces an elongated high enthalpy zone from the main arc along the tail flame. Ore in particulate form is introduced at a point in front of the arc zone for flow through the arc zone and the tail flame along the axis of the high enthalpy zone and the products are then collected in a trapping system so that they remain in a suitable form for further process. Generally the ore is entrained in a transport gas for introduction and passage through the high enthalpy zone.

In a particular process the high enthalpy thermal environment is established in a halogen or halide containing atmosphere and ore in particulate form is introduced through the arc to provide a chemical reaction making the platinum more amenable to separation by known commercial techniques. In another specific process the high enthalpy environment is established in a reducing atmosphere and ore containing nickel and cobalt is introduced through the arc into the high enthalpy zone producing a chemical reaction that makes the metals more amenable to recovery by commercial techniques.

Attempts have been made in the past to smelt ores using non-transferred plasma torches, i.e., those torch designs in which the arc terminates within the plasma torch and plasma forming gas is blown through the arc region therein issuing from the torch as a free plasma, but with little success, as heretofore it has been difficult to feed solid or liquid particles to the high energy thermal zone or arc region without choking or clogging the reaction zone or contaminating the electrodes or to retain the reactants in the high energy zone long enough to achieve the desired reaction. Previous successful reaction systems employing plasma arcs have normally been limited to gaseous reactants in the high energy zone of the non-transferred arc.

For the first time it is possible to economically employ solid or liquid reactants in the high energy zone of a plasma arc and obtain realistic throughputs and yields, as defined hereinafter. The success of the present process may be attributed to the fact that a high enthalpy environment is employed, typically a high intensity arc, in which electrode material is vaporized. The vaporization of the electrodes appears to effect a self-washing and eliminates the choking and contamination problems previously encountered. Although Shear and Korman in U.S. Patents 2,616,843 and 3,099,614 appreciated that a high intensity mode might be employed, they considered, in order to achieve adequate contact of the ore with the arc zone, that the ore must be incorporated into the electrode.

Another object of this invention is to provide improved apparatus for the high temperature processing of particulate material. Still another object of this invention is to provide improved apparatus for the winning of metals from ores, concentrates or residues containing metal values.

Broadly, the apparatus of the present invention comprises a high intensity arc generator which establishes an elongated high enthalpy zone; means for providing a controlled atmosphere around said arc so that a material flow condition through the high enthalpy zone is established by the arc; means for injecting material to be treated at least some of which is solid or liquid, into the region of the arc for passage through the high enthalpy zone with sufficient residence time in said zone for desired treatment to occur; and means for recovering the desired products in stable form. Improved utilization of ores can be achieved by the present process and apparatus which can be used for many reactions of which the following are typical:

Metal oxides to metal.
Metal oxides to metal halides.
Metal halides to metals.
Dissociation of complex minerals to simple compounds.

When ores or concentrates are normally processed for the extraction of the primary metal content, the gangue material which usually consists of oxides and silicates of such metals as iron, aluminum and magnesium and which may constitute a high percentage of the total weight is recovered as a metallurgical slag or other form of waste residue. In the process described herein, increased amounts of mineral compounds, metal values and gangue minerals can be altered and reformed into pure compounds of commercial value, for example $Al_2O_3$, MgO, amorphous $SiO_2$ or metallic Al and Mg in addition to the primary metal.

The invention will now be described in more detail by reference to the accompanying drawings in which.

Figure 1:
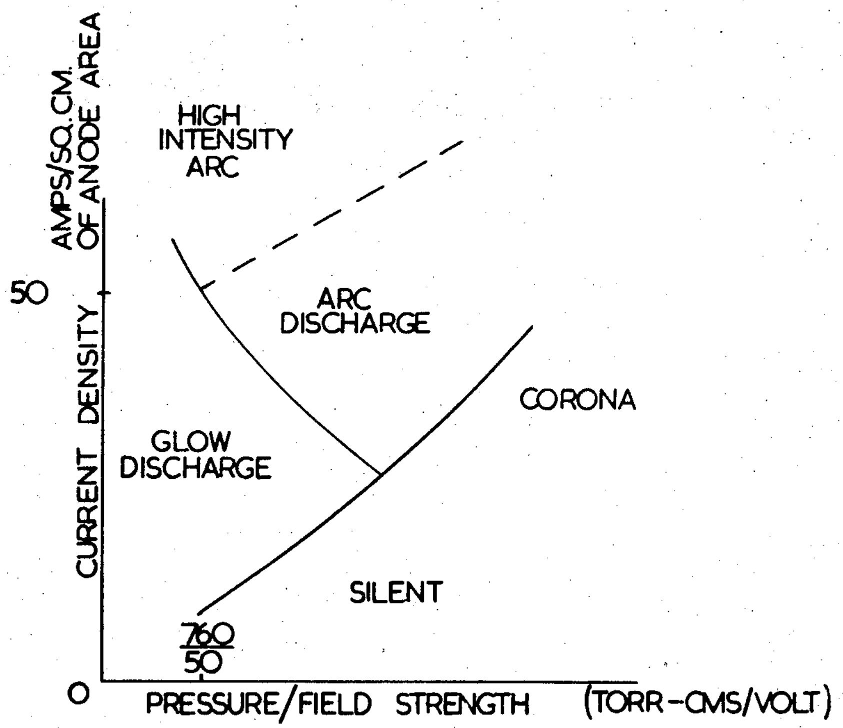
FIG. 1 is a sketch of typical arc discharge regimes.

As previously indicated, the present invention is concerned with high enthalpy thermal environments and the invention will be described particularly with reference to high intensity arcs. High intensity arcs can be differentiated from other forms of arc discharge such as have been used in the prior art and the various forms are summarized in FIG. 1 which is a sketch showing typical discharge regimes in relation to current density and pressure/field strength and which is based on the publication "Chemical Kinetics of Gas Reactions" by V. N. Kondrat'ev, published by Addison and Wesley 1964. Such high intensity arcs are produced at very high current densities in contrast to a silent discharge, for example, which is produced at low current densities.

Figure 2:
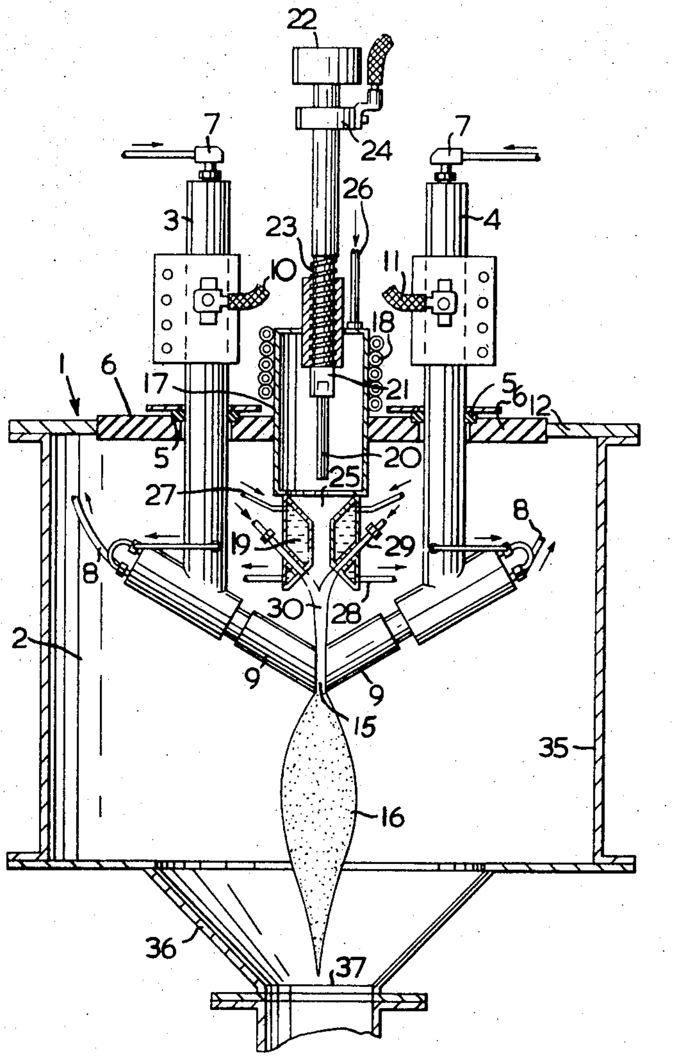
FIG. 2 is a diagrammatic sketch of one embodiment of the apparatus used for the present process.
Figure 3:
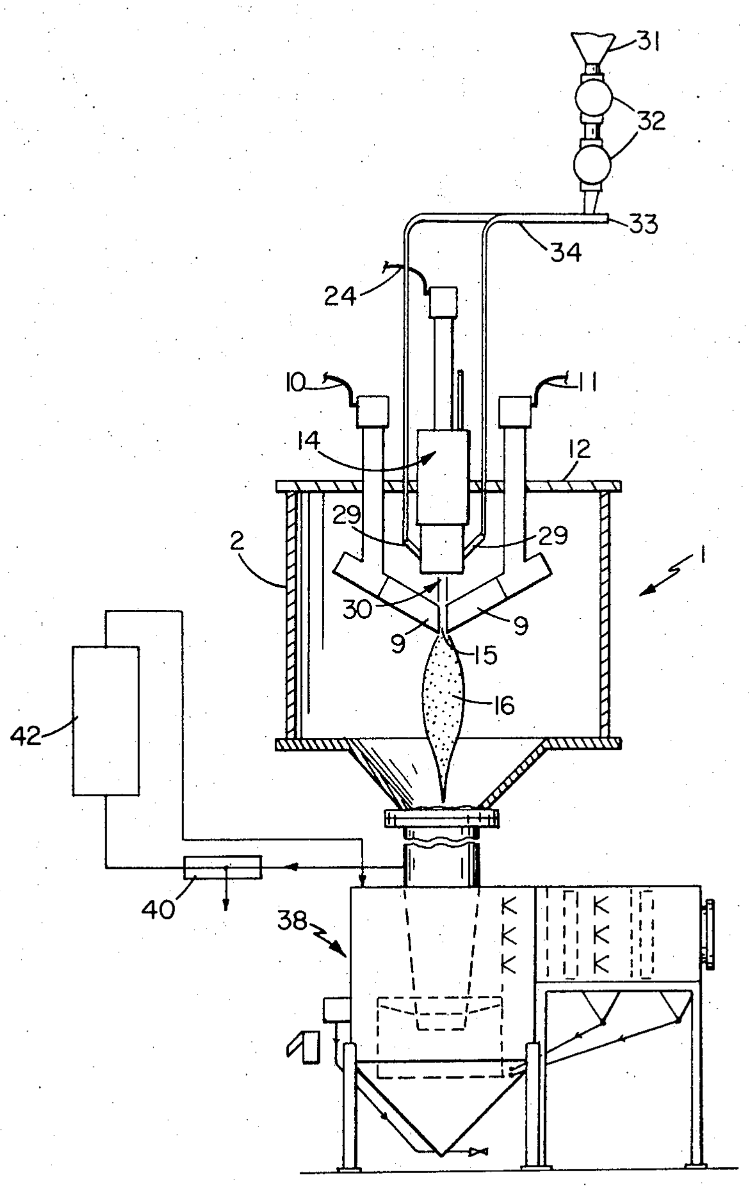
FIG. 3 is a diagram of a system incorporating the apparatus shown in FIG. 2.

Referring now to FIGS. 2 and 3, there is shown a furnace according to the present invention, together with some of the ancillary equipment which is associated with it.

The furnace, shown generally at 1 comprises a reaction chamber 2 preferably constructed of a corrosion resistant material such as stainless steel into which electrode holders 3 and 4 project through gas sealing rings 5 and ceramic insulating discs 6 located in lid 12. Electrode holders 3 and 4 are preferably fluid cooled via inlets 7 and outlets 8, and depending on the power supply contemplated can be fabricated from any good electrical conductor such as tungsten, copper-tellurium, copper, aluminum or various combinations thereof. Electrode holders 3 and 4 are adapted to be adjusted both vertically and horizontally in order to maintain electrode spacing during operation. Graphite electrodes 9 are held in holders 3 and 4 by known means such as clamping or screwing and during operation the tips of said electrodes vaporize in a self-cleaning operation and also provide carbon which may act as a reductant for the feed materials or may merely escape as an oxide of carbon. Graphite electrodes are the most suitable for this application but in certain circumstances, other electrode materials which would not contaminate or interfere with the described reactions could be used. Power is supplied to the electrode holders via power leads 10 and 11 from a power source (not shown). Either AC or DC power sources are contemplated by the present invention, depending on the type of material being treated, specific electrode configuration and power supply available. In the embodiment shown in FIG. 2 an AC supply was found suitable, and was conveniently about 55 volts and 1150 amps. at 400 Hz. With this power supply it was found that difficulties encountered in maintaining a stable arc at a suitable electrode spacing for the introduction of feed could be at least partially overcome by superimposing a high voltage, low amperage, high frequency current on the main power supply. Typically, a 6 kw. 5 mHz. current may be employed. Alternatively, or additionally, at least a portion of a carrier gas may be pre-ionized before passing between the main electrodes 9, thereby ensuring a continuous conducting path for the main power supply. The said carrier gas is conveniently pre-ionized in a pre-ionizing unit also mounted in lid 12. In FIG. 2 this unit is shown above electrodes 9 for convenience, but it will be appreciated that this furnace may be operated in a horizontal plane as well as in a vertical plane.

The pre-ionizing unit 14 comprises a grounded control head 17 mounted through ceramic disc 6 and equipped with external water cooling coils 18. An annular water cooled electrode 19, preferably of tungsten, forms the lower end of control head 17. An electrode 20 also preferably of tungsten, is mounted in a holder 21 vertically above the annulus of said electrode 19, and equipped with a height adjusting knob 22 which rotates holder 21 in the threaded portion 23 to adjust the position of electrode 20. Power is supplied to electrode 20 via a lead 24 from a power supply not shown. An arc is struck between electrodes 19 and 20 and a gas, preferably but not essentially an inert gas, is passed through the arc zone 25 from inlet 26 generating a low intensity plasma 30. Argon or nitrogen are particularly suitable gases in the pre-ionizing unit. Fluid cooling is provided to electrode 19 via inlets 27 and outlets 28. When arc zone 25 is stabilized a carrier gas for the main plasma between electrodes 9 is introduced to the pre-ionizing plasma via inlets 29. The pre-ionized gas stream 30 is focussed above the main electrodes and the partially ionized gases are carried into the main high intensity arc 15 generated between electrode tips 9. When the pre-ionizing plasma stream 30, the main arc 15 and the tail flame 16 are stabilized the ore feed may be started and introduced to the furnace via inlets 29 mixed with the high intensity plasma carrier gas, which may be inert but is more usually a reactant gas such as natural gas, air or hydrogen. Ore, or other solid or liquid reactants, is stored in a conventional feed hopper which is provided with a conventional feeder to draw feed material from the hopper at a steady, controlled and predetermined rate.

After passing through the pre-ionized low intensity plasma 30 the main arc 15 and the tail flame 16, the reactants are cooled in the reaction chamber 2. Chamber 2 includes a parallel side portion 35 and a frusto conical tapering section 36, and may include external and internal controlled cooling means such as water sprays or gas coolant jets (not shown) to control the temperature at various levels in the reaction chamber. It is necessary that the reaction chamber shall be of sufficient volume to contain the plasma flame 16 and to permit sufficient residence time to complete the reactions, and to effect a sufficient degree of cooling. A conventional high efficiency wet scrubber 38 (FIG. 3) may be connected directly to the outlet 37 of the reaction chamber. This scrubber has the three fold purpose of removing heat from the effluent, both gaseous and solid, collecting solid products and taking into solution soluble products of the chemical reactions. Optionally an additional collection circuit including a magnetic separator (diagrammatically indicated at 40) and a baghouse 42 may be employed.

In the embodiment shown in FIGS. 2 and 3 a single pair of electrodes is employed, but it will be appreciated by those skilled in the art that a plurality of electrodes may be employed. Basically the operation of such embodiments is the same as that of FIGS. 1 and 2 and may be operated on AC or DC power supply.

In operation, feed material such as an ore, is prepared by reducing the particle size to about 100% through 30 mesh, by any of the standard ore dressing techniques and followed by complete drying.

The prepared feed is stored in a feed hopper 31 having a uniform controlled discharge rate, metered through a system of rotary valves 32 or similar devices which serve as a gas seal to prevent blow back of furnace gas, and then directed to a mixer device 34 where it is mixed with a carrier gas which enters via inlet 33. The carrier gas may be relatively inert, for example, nitrogen or argon or it may be one of the reactants for example, chlorine, carbon monoxide, air or oxgen, depending on the desired reactions. In the embodiments of the apparatus shown in FIGS. 1 and 2 the feed and carrier gas are injected via inlets 29 into the gas flame 30 produced by the pre-ionizing unit 14 which conveniently is a conventional AC plasma torch typically generating a flame about ¼" in diameter and 1" long with a 10 kw. power supply.

The feed materials are thus suspended in a partially ionized gas stream which is then directed into the high enthalpy thermal environment of main arc 15 and tail flame 16, produced by overpowering graphite electrodes 9 which are connected to a 400 cycle AC power source (not shown). It has been found that the pre-ionized gas stream is desirable to maintain an electrical path between the graphite electrodes, but that if the electrode spacing is increased, for example in order to increase the feed, the circuit may be broken and the arc extinguished. In order to prevent this and to ensure continuous operation of the arc a five megacycle current from an oscillator may be connected across the graphite electrodes 9. This high voltage, low amperage current provides an ever present ionized path across the electrodes for the 400 cycle current. Alternatively a relatively low voltage direct current may be applied across electrodes 9 in which case the superimposed high frequency current is unnecessary to prevent extinguishment of the arc. Other methods for stabilizing the arc will readily suggest themselves to those skilled in the art. Power input to electrodes 9 can vary over a wide range and electrode diameter may also vary with the power input in order to maintain a high current density at the electrode face, sufficient to produce a positive resistance characteristic on main arc 15. When multiple electrodes are employed, pre-ionizing of the carrier gas and preheating of the feed may not be necessary and therefore in some cases the pre-ionizing unit may be omitted. Similarly it may not be necessary to apply a superimposed current on the main arc current in order to stabilize the arc.

As those skilled in the plasma arc art will readily appreciate, the tail flame generated in a high intensity plasma torch using comsumable electrodes can be up to 18 inches long at 50 kw. or even longer, depending on the power available and may be as hot as 8,000–10,000° C. at the base. The flame is of relatively low velocity and therefore it is possible to obtain extremely long retention times for materials passed through the flame. Furthermore, the degree of ionization in the tail flame of a high intensity plasma may be as high as 10–40% in contrast to a low intensity arc where the ionization rarely exceeds 5%. In this highly energetic state the free ions recombine according to the normal laws of kinetics and thermodynamics to seek the lowest energy state. Some reactions may take place in the very high temperature plasma zone but others may take place as the reactants cool below the dissociation temperature of the desired product on leaving the high enthalpy zone. In many instances the free metal may be produced, while in others simple metal compounds are produced from complex starting materials which can then be extracted by standard pyrometallurgical or hydrometallurgical procedures. In yet other cases, a metal compound may be formed which is amenable to a further treatment through the plasma zone under a different processing environment to produce the free metal in a two stage process.

Figure 4:
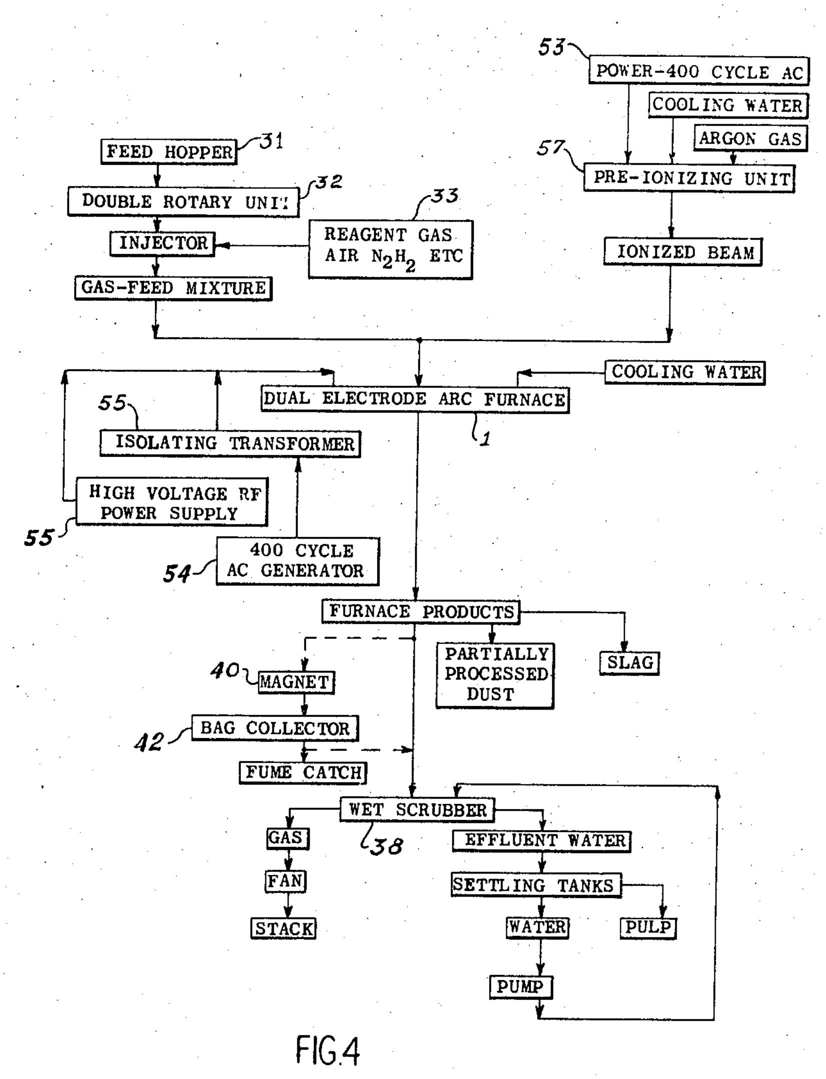
FIG. 4 is a schematic flow diagram for one embodiment of the invention.
Figure 5:
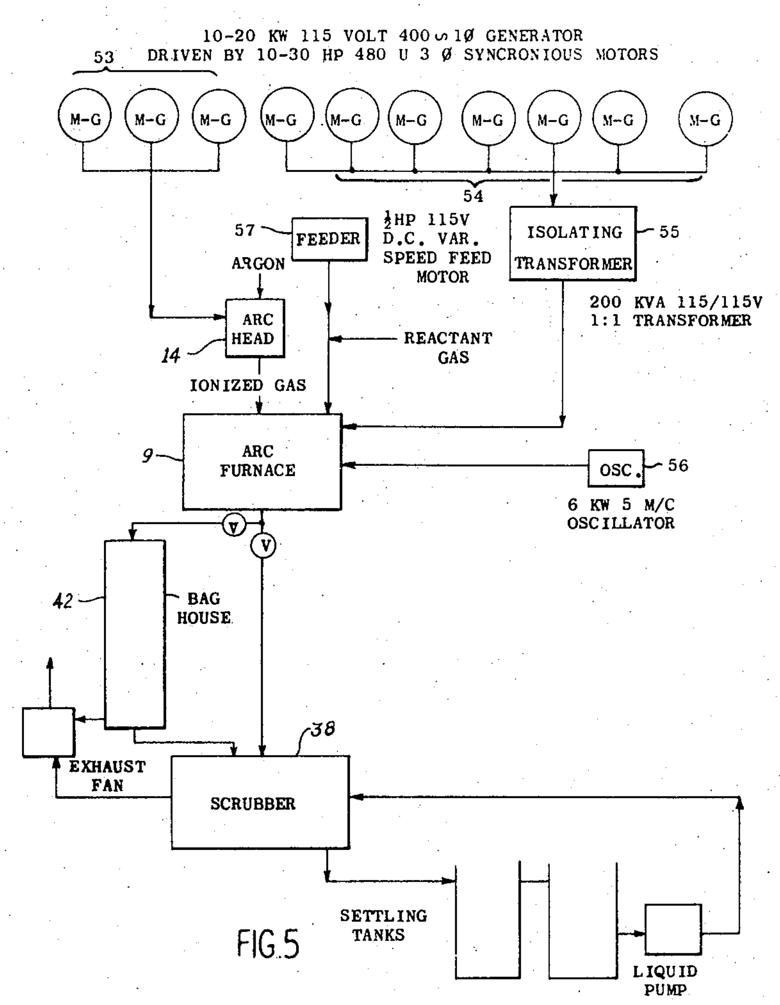
FIG. 5 is a schematic flow diagram of the embodiment of the invention shown in FIG. 4 with certain of the electrical requirements.

The plasma tail flame from the high intensity arc is directed into the reaction and cooling chamber 2 where controlled cooling can be achieved by means of external or internal water sprays (not shown), cooling gas jets or other means. Many desired reactions have ben found to occur when the reactants have cooled to about 2000° F., but this temperature is entirely dependent on the particular reactants and, as indicated previously, cooling is not essential in all cases. The furnace products, both solid and gaseous, pass directly from the reaction chamber and, as more clearly outlined in FIGS. 4 and 5 which are flow diagrams of the process, can be collected in a series of wet scrubbers and other conventional dust collecting equipment. The solutions and solids recovered from the gas handling system are processed for the recovery of metal values as refined metals or marketable compounds by conventional metallurigcal techniques.

EXAMPLE 1

In the series of tests reported here a leach residue from Sherritt-Gordon Mines Ltd. was used the raw material. This residue is a relatively complex waste product resulting from pressure leaching a Ni-Co concentrate and which still contains combined nickel and cobalt values in a form not previously considered recoverable.

TABLE 1

Representative head assay of leach residue

| | Percent |
|---|---|
| Nickel (Ni) | 0.85 |
| Cobalt (Co) | 0.19 |
| Copper (Cu) | 0.13 |
| Iron (total) (Fe) | 47.48 |
| Sulphur (total) (S) | 10.67 |
| Carbon (C) | 2.35 |
| Acid-insol. ($SiO_2$ etc.) | 21.90 |

Prior to each test run the furnace (as shown in FIG. 2), dust collection units and all internal surfaces were thoroughly cleaned to prevent contamination and ensure standard conditions. The feed material was weighed into the feed hopper. The 400 cycle generators for the preionizing and main units were started and synchronized. The preionizing unit was then started usually employing three of the 400 cycle motor generators and using argon gas as the plasma medium. When this operation became stable the main ionizing unit was started usually employing seven of the 400 cycle motor generators and using air, nitrogen or hydrogen as the plasma and reactant gas. As soon as the operation stabilized the feeder was started and operated at a predetermined rate until the hopper was empty. Upon completion of the run, all dry materials were collected from the entire apparatus, sampled and weighed and the scrubber solution volume was measured. The solution was allowed to settle overnight and solid material was separated by filtering.

TEST 1

| | |
|---|---|
| Feed processed | 4540 grams. |
| Feed rate | 454 grams/minute. |
| Gas on pre-ionizing unit | Argon at 10 s.c.f.h. (approx.). |
| Gas on main arc | $CH_4$ (natural gas) at 150 s.c.f.h. |
| Power input | 60 kw. |

TABLE 2.—FURNACE PRODUCTS RECLAIMED BY BAG FILTER
[Approximate metallurgical balance]

| Material | Grams | Fe Percent | Fe Grams | Ni Percent | Ni Grams | Co Percent | Co Grams | S Percent | S Grams | Insol. Percent | Insol. Grams |
|---|---|---|---|---|---|---|---|---|---|---|---|
| Feed | 4,540 | 42.9 | 1,948 | 0.75 | 34 | 0.19 | 9 | 11.7 | 531 | 17.7 | 804 |
| Total product | 3,859 | 47.5 | 1,834 | 0.85 | 33 | 0.19 | 7 | 10.7 | 413 | 21.9 | 844 |
| ± Unaccounted | 681 | | −114 | | −1 | | −2 | | −118 | | +40 |

The solid furnace products reclaimed in the bag filter were carefully sampled and 50 grams were leached for 16 hours at room temperature in an open bottle with 100 ccs. ammonium hydroxide (28% $NH_3$) and 25 gms. ammonium carbonate. This treatment showed that 66.6% of the nickel based on the feed assay could be extracted from the processed material by a simple leaching step (no pressure). It will be remembered that the starting material is a nickel pressure leach residue and therefore that above result is extremely favorable and indicates that passage through the high enthalpy zone has achieved an extensive solubilization of the nickel values in the pressure leach residue. As a double check on the efficacy of the treatment, similar leaching tests were performed on the pressure leach residue and under the best laboratory conditions it was found that only 23.7% of the nickel could be solubilized.

Further tests were conducted to determine the effects of other reactants as listed in the following:

TEST 2

This test was performed to ascertain whether the nickel values could be chlorinated, and rather than employ chlorine gas in the plasma zone, sodium chloride was added to the feed materials.

Run H–8.—Operating data

| | |
|---|---|
| Feed processed | 8172 grams (includes 2.5% NaCl). |
| Feed rate | 450 gr./min. |
| Gas on pre-ionizing unit | Argon at 10 s.c.f.h. |
| Gas on main arc | Nitrogen at 150 s.c.f.h. |
| Power on main arc | 50 volts, 1150 amps, 400 Hz. |

Furnace products discharged directly to scrubber.
Results (see Table 3 overleaf).

From these results it can be seen that about 75% of the feed materials were collected either in the scrubber as solids or as a dust at the bottom of the reaction chamber Each of the products was sampled and, as before, subjected to an ammonium hydroxide leach. A nickel balance shows the effects of the plasma treatment on the leaching properties of the products.

TABLE 3

| | Feed Percent | Feed Weight (gms.) | Products Slag | Products Dust | Products Scrubber solids | Products Scrubber solution | Gas | Unbalance |
|---|---|---|---|---|---|---|---|---|
| Fe | 41.3 | 3,375 | 446 | 610 | 2,238 | 92 | | 11 |
| Ni | .79 | 65 | 8 | 13 | 35 | 5 | | −4 |
| Co | .16 | 13 | 1.45 | 2.18 | 8.34 | .9 | | |
| Cu | .05 | 4 | 1 | 1 | N.A. | .5 | | −2 |
| S | 11.24 | 915 | 58 | 92 | 433 | 170 | 162 | |
| Na | | 109 | 10 | 15 | | 88 | | 4 |
| Cl | | 167 | | N.A. | | 162 | | −5 |
| Remainder | | 3,524 | 384 | 624 | 2,047 | 356 | 162 | 49 |
| Total | | 8,172 | 909 | 1,357 | 4,761 | 864 | 324 | 53 |

NICKEL BALANCE

| Fraction | Nickel (grams) | Grams placed in solution on leaching with $NH_4OH$ |
|---|---|---|
| Sample | 65 | |
| Slag | 8 | .27 |
| Dust | 13 | 2.14 |
| Solids | 35 | 2.10 |
| Solution | 5 | 5.01 |
| Gas | | |
| Unaccounted | 4 | |
| Total | 65 | 9.52 |

Placed in solution—15%.

Placed in solution by ammonium leaching from untreated head sample H–8—26%.

In this case the particular NaCl treatment did not make the nickel values in the residue significantly more extractable by a simple leaching technique.

TEST 3

A further test was conducted employing hydrogen as the reactant gas in the main arc unit. No chlorine was added to the atmosphere in this case.

Operating data

| | |
|---|---|
| Feed processed | 5618 gms. |
| Type | Sherritt Gordon Residue. |
| Feed rate | 490 gms./min. |
| Gas on pre-ionizing unit | Argon at 10 s.c.f.h. |
| Gas on main arc | Hydrogen at 150 s.c.f.h. |
| Power on main arc | 55 volts, 1150 amps. |

Results (see Table 4 overleaf).

It will be noted that once again a considerable proportion of the feed material was so severely affected by passage through the arc that it was transformed into a gas or particles so fine that it was not retained in the recovery system. Applicant considers this a most surprising and significant feature. After passage through the arc zone the various products were recovered from different parts of the equipment and subjected to an ammonia leach with the following results:

NICKEL BALANCE

| Fraction | Nickel (grams) | Grams placed in solution by ammonia leach |
| --- | --- | --- |
| Head sample | 47 | [1] 12.31 |
| Slag | 2.78 | .49 |
| Dust A | 20.97 | 3.69 |
| Dust B | 9.65 | 1.65 |
| Fume | 3.90 | .73 |
| Solution | .12 | .12 |
| Solution solids | .16 | .02 |
| Unaccounted | 9.42 | 9.42 |
| Total | 47.00 | [2] 16.12 |

[1]=26.19%.  [2]=34.26%.

As the head sample shows only 25.19% of the nickel values can be recovered by an ammonia leach and up to 34.26% may be recoverable following the arc treatment, the arc treatment may produce increased solubilization of the nickel in the pressure leach residue material. Such result is of course contingent on the assumption that the "unaccounted" portion is in fact in the form of a gas which could be easily treated if a more elaborate recovery system, designed to catch gases, were employed.

EXAMPLE 2

In the test reported here, a similar procedure was employed as that of Example 1 using Tulameen sand as the head material together with an NaCl addition as an alternative to using chlorine gas as the carrier.

The Tulameen material is from a river deposit ranging in size from gravel to fine sand and clay. Recent work using atomic absorption techniques has shown that this material bears values in gold, silver, platinum and other of the platinum group metals.

These previous metal values occur in part as very finely divided free metal, in part as free metal precipitated in a matrix of magnetite and/or chromite, and, it is believed, in part as mineralogical complexes.

There is also evidence that these sands carry values in other "heavy" minerals such as euxenite, columbite, monazite, rutile, ilmenite, chromite, magnetite, etc. By known ore-dressing techniques, a complex heavy concentrate can be recovered. To process this complex concentrate by conventional extractive metallurgical techniques for the optimum commercial recovery of the metal values would be most difficult, tedious and expensive. Dissociation of the complex minerals in the high energy environment characteristic of a plasma and the reformation of simpler compounds on a continuous basis offers the metallurgist a simpler approach for the recovery of more of the contained metal.

The sample of sand processed had a mesh size of about 100% through 30 mesh and an approximate head assay of:

| | |
| --- | --- |
| Silica ($SiO_2$) | 33.13%. |
| Iron (Fe) | 24.05%. |
| Lime (CaO) | 5.42%. |
| Magnesium Oxide (MgO) | 5.57%. |
| Alumina ($Al_2O_3$) | 7.35%. |
| Sulphur (S) | Trace. |
| Sodium Oxide ($Na_2O$) | 3.75%. |
| Gold (Au) | 0.11 oz./ton. |
| Platinum (Pt) | 0.7 oz./ton. |

This sample was loaded into the feed hopper together with a 10% addition of NaCl designed to provide sufficient chloride ions for the desired reaction. Alternatively, chlorine carrier gas could be used.

The pre-ionizing plasma 30 was started by striking an arc between electrodes 19 and 20 using about a 10 kw. A.C. power supply from 3 motor generator sets 53. Argon was admitted under pressure via inlet 26 as the pre-ionizing plasma gas. When the pre-ionizing plasma arc was stabilized air was admitted via inlet 33 and inlets 29 and the main arc 15 was struck between electrodes 9 using a 55 volt 1150 amp. 400 Hz. A.C. power supply from 7 motor generator sets 54 via an isolating transformer 55. A high voltage, low amperage, high frequency alternating current of 5 mHz. from an oscillator 56 was superimposed on the main power supply in order to stabilize the arc. When the whole system had stabilized, the feeder 57 on the hopper 31 was started and the precious metals containing material was fed through the rotary valves 32 to the mixing device 34, where it was intimately mixed with the suspending carrier gas (air), from inlet 33, and carried to inlets 29 and thus injected into the arc zone 30 where the solid feed material and the carrier gas, in this case air, were raised to a high energy level. The gas and solid flow was then passed between electrode tips 9, which were adjusted to permit maximum passage of material without extinguishing the arc. It was found that a feed rate of 330 gms./min. could be achieved with an electrode spacing of ¼" and a power supply of 60 kva. 400 Hz. when a 6 km. 5 mHz. superimposed current was applied. The solid materials, suspended in the reaction gas were at least partially dissociated in their passage through the high intensity zone and tail flame plasma stream 16, and were permitted to cool in reaction chamber 2 to enable the chemical reactions to take place. Some cooling gas was injected into the reaction chamber to effect control of the temperature within the chamber. The products of the reaction were recovered from the conventional scrubber 38 and were assayed as follows:

ANALYSIS OF PRODUCTS

| | Percent | | | Scrubber solution, p.p.m. |
| --- | --- | --- | --- | --- |
| | Slag | Dust | Scrubber solids | |
| Silica ($SiO_2$) | 30.18 | 30.42 | 38.93 | 86 |
| Iron (Fe) | 29.51 | 28.25 | 25.11 | 45 |
| Calcium oxide (CaO) | 5.20 | 5.12 | 4.72 | 21 |
| Magnesium oxide (MgO) | 5.47 | 5.52 | 5.86 | 25 |
| Alumina ($Al_2O_3$) | 6.20 | 4.40 | 6.75 | 132 |
| Sulphur (S) | 0.61 | 0.86 | 1.31 | 195 |
| Sodium oxide ($Na_2O$) | 2.50 | 3.68 | 1.25 | 430 |
| Gold | | | | 0.08 |
| Platinum | | | | 0.3 |

TABLE 4

| | Feed, wt. gms. | Slag | Dust A | Dust B | Baghouse fume | Scrubber solids in fluid | Scrubber solution | Gas | Unbalance |
| --- | --- | --- | --- | --- | --- | --- | --- | --- | --- |
| Fe | 2,337 | 150 | 1,089 | 485 | 160 | 12 | 1.3 | | −439 |
| Ni | 47 | 2.78 | 20.97 | 9.65 | 3.9 | .16 | .12 | | −9.42 |
| CaO | 174 | 7 | 58 | 18 | 6 | .5 | 18 | 7 | −59 |
| S | 617 | 36 | 255 | 115 | 56 | 2.34 | 20 | 132 | |
| Remainder | 2,443 | 116 | 1,074 | 377 | 71 | 10.23 | 59.5 | 566 | −169 |
| Total | 5,618 | 312 | 2,497 | 1,005 | 297 | 25.23 | 99 | 705 | −677 |

or, expressing these figures as grams of products recovered in each section: (See Table 5 overleaf).

TABLE 5

| | Feed | | Products | | | | | |
|---|---|---|---|---|---|---|---|---|
| | Percent | Wt. gms. | Slag | Dust | Scrubber pulp | Scrubber solution | Gas and unbalance | Percent missing |
| Fe | 24.05 | 921 | 67 | 177 | 113 | 9 | 558 | 60.3 |
| $SiO_2$ | 33.13 | 1,268 | 69 | 190 | 175 | 8 | 826 | 65.1 |
| CaO | 5.42 | 208 | 11 | 32 | 21 | 3 | 141 | 67.8 |
| MgO | 5.57 | 213 | 12 | 34 | 27 | 3 | 137 | 64.3 |
| $Al_2O_3$ | 7.35 | 286 | 14 | 28 | 31 | 15 | 198 | 69.2 |
| Sodium | | 160 | 4.3 | 17 | 5 | 64 | 69 | 43.1 |
| Chlorine | | 246 | | N.A. | | 130 | 116 | 47.2 |
| S | Trace | | 1.4 | 5.6 | 5.9 | 39 | 52 | |
| $O_2$ (E) | | 351 | 19 | 71 | 43 | 78 | 140 | |
| Unknown | | 177 | 29 | 70 | 29 | 3 | 46 | |
| Total | | 3,830 | 227 | 638 | 450 | 352 | 2,163 | |
| Platinum, gms | | 0.09183 | | | | 0.06 | | |
| Gold, gms | | 0.0144 | | | | 0.016 | | |

It will be appreciated from the results of this test that significant changes have occurred during the passage through the high intensity zone. A small amount of slag from which all volatile chlorine has been removed is produced, together with a quantity of dust which represents material which did not go through the high intensity zone or at least was not markedly affected. Due to the design of the equipment a certain amount of dust resulted from material which bounded off the electrodes and did not fall through the high intensity zone. The scrubber pulp represents material, which is insoluble but is sufficiently coarse to be caught in the scrubber, is primarily the residue from silicate sands of the feed. The scrubber solution represents material which has gone through the arc and has solubilized. It will be noted that a very large percentage of the feed chlorine appears in the scrubber solution, and hence it may be said that considerable chlorination of the sands has occurred. It will be further noted that the precious metals, gold and platinum, occur in the scrubber solution. Gold is, in fact, present to the extent of in excess of 100% of the assay of the initial feed material, a discrepancy which may be explained by inaccuracies attendant on the assay procedure. Platinum appears in an amount corresponding to 65% of the platinum in the feed assay and applicant considers this significant evidence that there has been a selective chlorination of the precious metals on passage through the arc. A considerable volume of gas was generated in the reactions and it will be observed that there is a considerable unbalance of the output when compared to the input. This unbalance is either a gas or very finely divided particles produced in the arc which are not trapped by the scrubber and are lost in the exhaust system. This may be significant when it is appreciated that the relatively coarse feed materials have been reduced to a dimension too small to be trapped in a relatively efficient gas scrubbing system. Clearly severe changes have been effected.

The most significant result of the above test is the indication that the precious metal values in the tested alluvial sand which heretofore were difficult to recover have been converted from insoluble to soluble form in the presence of large amounts of iron and other metals in the ore on passing through the described apparatus.

In considering the test results obtained in all of the above tests it will be appreciated that a new and highly useful method of treating ore has been developed. By this process nickel in commercially attractive amounts has been recovered from residues which have been previously treated by the most efficient means known to metallurgists at the present time, namely pressure leaching for the extraction of nickel. Similarly, precious metals (gold and platinum) have, by passing the host material through a high enthalpy environment, with NaCl as a selected reactant, been put into a form (water soluble) much more amenable to recovery by conventional means than would be the case if the same host material were to be processed by the normal metallurgical techniques. At the same time, other metals reporting in the host material as complex heavy minerals, and having commercial value, are also made recoverable. In addition to these recoveries the present process can be applied to many other metallurgical reactions, such as those enumerated in column 4, lines 6 through 19 of the present disclosure.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention as defined in the claims.

I claim:

1. A process of the continuous type for treating a flowable non-gaseous material which comprises the steps of establishing an electric arc condition in an atmosphere with a pair of elongated spaced carbon-containing electrodes having active end surfaces which define a passage through which the material to be treated passes, maintaining said arc condition at a current density sufficient to give the arc a positive resistance characteristic to establish a high enthalpy zone, introducing said flowable material into said atmosphere for passage between said surfaces through said maintained arc and said high enthalpy zone to significantly heat effect said material, and allowing the material to pass from said high enthalpy zone through a cooling atmosphere to a collection zone.

2. A process according to claim 1 wherein said maintained arc condition is a high intensity arc discharge and has a tail flame so that an elongated high enthalpy zone is defined and sad flowable material passes through said zone along the axis thereof.

3. A process according to claim 1 wherein said electrodes are energized by direct current.

4. A process according to claim 1 wherein said electrodes are energized by alternating current.

5. A process according to claim 1 and further including the step of suspending said material in a carrier gas for introduction into said high enthalpy thermal zone.

6. A process according to claim 1 and further including the step of injecting a suspension of material into a plasma stream, thereby producing an at least partially ionized stream of gas containing said suspended material and then introducing said at least partially ionized suspension into said high enthalpy zone.

7. A process according to claim 1 and further including the further step of injecting a gas into said high enthalpy zone.

8. A process according to claim 7 wherein said gas is involved in a chemical reaction with the material introduced into said high enthalpy zone.

9. A process according to claim 7 wherein said gas is an inert gas.

10. A process according to claim 1 wherein said electric arc condition is established in a controlled atmosphere, the gas in said controlled atmosphere being selected from the group of chlorine, hydrogen, oxygen, natural gas and air.

11. A process according to claim 1 wherein said treatment produces a chemical reaction selected from the group consisting of:

Metal oxides to metal
Metal oxides to metal halides
Metal halides to metals
Dissociation of complex minerals to simple compounds.

12. A process according to claim 1 wherein said material is selected from a group consisting of ores, concentrates, and residues and further including the step of separating a desired metal or metal compound from other compounds produced as a result of the passage of the flowable material through said high enthalpy zone.

13. A process according to claim 1 for recovering platinum including the step of maintaining said arc condition in a halogen or halide containing atmosphere.

14. A process according to claim 13 wherein said atmosphere contains chlorine.

15. A process according to claim 1 for recovering nickel including the step of maintaining said arc condition in a reducing atmosphere.

16. A process according to claim 15 wherein said atmosphere contains natural gas.

17. A process according to claim 15 and further including the step of subjecting material from said collection zone to an ammonia leach.

18. Apparatus for treating a flowable non-gaseous material comprising:

a first chamber for containing a controlled atmosphere, a second chamber in communication with said first chamber for containing a cooling atmosphere;
a pair of elongated, carbon containing electrodes spaced apart in said first chamber and having active end surfaces which define a passage through which the material to be treated passes;
circuit means for energizing said electrodes to produce a high intensity electric arc condition having a positive resistance characteristic at a current density sufficient to establish a high enthalpy environment; and
entrance port means above said electrodes for introducing said non-gaseous material into said first chamber for flow through said passage between said surfaces through said high enthalpy environment to significantly heat effect said material, and subsequent passage through said cooling atmosphere in said second chamber to said collection zone.

19. Apparatus according to claim 18 wherein said entrance port means includes a first passage for introducing particulate material and a second passage for introducing a carrier gas for conveying said particulate material along the flow path between said electrodes.

20. Apparatus according to claim 18 and further including a pre-ionizer for at least partially ionizing material introduced through said entrance port means prior to entry into said high enthalpy zone.

21. Apparatus according to claim 18 wherein said circuit means includes an AC source for energizing said electrodes to produce a high intensity arc discharge.

22. Apparatus according to claim 18 wherein said circuit means includes a DC source for energizing said electrodes to produce a high intensity arc discharge.

23. An apparatus as claimed in claim 18 for carrying out reactions between metals, ores, concentrates and residues and gaseous reactants further including a feed hopper for said metal ores; means to mix said metal ore with said gaseous reactant; a pre-ionizing plasma arc means; means to inject said mixed material and gas into said pre-ionizing arc and thence into said high intensity arc; and wherein said second chamber is a reaction chamber into which said high intensity arc projects, of sufficient size to permit dissociated reactants to cool in order that chemical reactions may take place; and separating means adjacent said reaction chamber to separate products of said reactions.

24. An apparatus as claimed in claim 18 for carrying out reactions between materials selected from the group metals, ores, concentrates and residues further including a feed hopper for said materials; means to mix said material with a carrier gas; and wherein said second chamber is a reaction chamber into which said high intensity arc projects, of sufficient size to permit dissociated reactants to cool in order that chemical reactions may take place; and separating means adjacent said reaction chamber to separate products of said reactions.

25. Apparatus for treating a flowable non-gaseous material comprising:

a first chamber defining a material treatment zone;
a pair of elongated, carbon containing electrodes spaced apart in said first chamber and having active end surfaces which define a passage through which the material to be treated passes;
circuit means for energizing said electrodes to produce and maintain an arc condition at a current density sufficient to establish a high enthalpy zone;
and entrance port means above said electrodes for introducing said non-gaseous material into said first chamber for flow through said passage between said surfaces through said high enthalpy zone to significantly heat effect said material.

26. The apparatus as claimed in claim 26 wherein said circuit means is arranged to establish and maintain a high intensity arc discharge with a tail flame so that an elongated high enthalpy zone is defined within said first chamber and further including a second chamber connected to said first chamber and containing cooling fluid for defining a cooling zone for receiving heat affected material from said first chamber.

27. A process for carrying out chemical reactions comprising the steps of providing a controlled atmosphere, establishing an electric arc condition in said atmosphere between a pair of elongated spaced carbon containing electrodes having active end surfaces which define a passage through which the material to be treated passes, maintaining said arc condition at a current density sufficient to give the arc a positive resistance characteristic to establish a high enthalpy zone, injecting selected reactants at least one of which is selected from the group solids and liquids into said controlled atmosphere for passage between said surfaces and through said high enthalpy zone to heat and at least partially dissociate said reactants so that desired chemical reactions may occur, and allowing the resulting material to pass from said high enthalpy zone through a cooling atmosphere to a collection zone.

28. A process for treating metallic material which comprises the steps of providing a controlled atmosphere, establishing an electric arc condition in said atmosphere between a pair of elongated spaced carbon containing electrodes having active end surfaces which define a passage through which the material to be treated passes, maintaining said arc condition at a current density sufficient to give the arc a positive resistance characteristic to establish a high enthalpy zone, suspending said metallic material in a carrier gas and injecting said suspension into said controlled atmosphere for passage between said surfaces and through said high enthalpy zone to significantly heat effect at least part of said suspension thereby permitting desired thermal reaction to occur and recovering products of said reactions.

29. A process for extracting metals from material selected from the group consisting of ores, concentrates and residues which comprises the steps of providing a controlled atmosphere, establishing an electric arc condition in said atmosphere between a pair of elongated spaced carbon containing electrodes having active end surfaces which define a passage through which the material to be treated passes, maintaining said arc condition at a current density sufficient to give the arc a positive resistance characteristic to establish a high enthalpy zone, injecting said material suspended in a carrier gas into said controlled atmosphere for passage between said surfaces and through said high enthalpy zone to heat and dissociate at least part of said material and cooling said dissociated material to a temperature at which a desired product is obtained.

30. A process for the extraction of metals from materials selected from the group consisting of ores, concentrates and residues which comprises suspending said material in a gas, injecting said suspension into a plasma stream thereby producing an at least partially ionized stream of gas containing said suspended materials, establishing an electric arc condition in a controlled atmosphere between a pair of elongated spaced carbon containing electrodes, maintaining said arc condition at a current density sufficient to give the arc a positive resistance characteristic to establish a high intensity arc region between said surfaces, directing said suspension into said high intensity arc region, heating and dissociating at least part of said suspension, cooling said dissociated suspension to permit desired reactions to occur and forming said metals in stable form, and separating said metals from said suspension.

References Cited

UNITED STATES PATENTS

| | | | |
|---|---|---|---|
| 2,921,892 | 1/1960 | Casey | 204—328 |
| 3,308,050 | 3/1967 | Denis | 204—311 |
| 3,390,980 | 7/1968 | Orbach et al. | 204—164 |

OTHER REFERENCES

High Intensity Electric Arc and its Application to Process Chemistry, pp. 19, 20 and 22, pub. by Vitro Corp. of America and Sheer-Korman Associates, 261 Madison Ave., N.Y., May 1956.

FREDRICK E. EDMUNDSON, Primary Examiner

U.S. Cl. X.R.

204—171, 178, 328

UNITED STATES PATENT OFFICE

CERTIFICATE OF CORRECTION

Patent No. 3,708,409 Dated January 2, 1973

Inventor(s) R. Bainbridge

It is certified that error appears in the above-identified patent and that said Letters Patent are hereby corrected as shown below:

Column 2, line 28, after "arc" insert --condition has a positive electrical resistance characteristic,-.

Column 5, line 62, "oxgen" should be --oxygen--.

Column 6, line 55, "ben" should be --been--;
line 71, after "used" insert --as--.

Column 8, Table 3, line 38, change "864" to --874--.

Column 9, line 40, "25.19%" should be --26.19%--.

Column 10, line 54, "6 km" should be --6 kw--.

Column 12, line 50, "sad" should be --said--.

Column 14, line 29, change the numeral "26" (second occurrence) to --25--.

Signed and sealed this 29th day of May 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334